(12) United States Patent
Thomsen et al.

(10) Patent No.: US 8,499,486 B1
(45) Date of Patent: Aug. 6, 2013

(54) PROPELLING DEVICE FOR BAIT AND LURES

(76) Inventors: Mark Thomsen, Mora, MN (US); Calvin Stemig, McGrath, MN (US)

( * ) Notice: Subject to any disclaimer, the term of this patent is extended or adjusted under 35 U.S.C. 154(b) by 297 days.

(21) Appl. No.: 13/024,659

(22) Filed: Feb. 10, 2011

(51) Int. Cl.
*A01K 91/02* (2006.01)

(52) U.S. Cl.
USPC .............................................. 43/19

(58) Field of Classification Search
USPC .............................................. 43/19
See application file for complete search history.

(56) References Cited

U.S. PATENT DOCUMENTS

| | | | | |
|---|---|---|---|---|
| 997,730 A * | 7/1911 | Aten | | 43/19 |
| 1,054,916 A * | 3/1913 | Gray | | 43/19 |
| 1,473,507 A * | 11/1923 | Obermaier | | 43/19 |
| 2,089,744 A * | 8/1937 | Golden | | 43/19 |
| 2,548,102 A * | 4/1951 | Elliott | | 43/19 |
| 2,823,482 A * | 2/1958 | Kremski | | 43/19 |
| 2,873,547 A * | 2/1959 | Coelho | | 43/19 |
| 2,875,548 A * | 3/1959 | Stewart | | 43/19 |
| 2,885,815 A * | 5/1959 | Clagg | | 43/19 |
| 2,930,584 A * | 3/1960 | Hamrick et al. | | 43/19 |
| 2,932,111 A * | 4/1960 | Kremski et al. | | 43/19 |
| 3,000,129 A * | 9/1961 | Rainey | | 43/19 |
| 3,001,316 A * | 9/1961 | Fefelov | | 43/19 |
| 3,026,644 A * | 3/1962 | Raider | | 43/19 |
| 3,255,548 A * | 6/1966 | Whritenour | | 43/19 |
| 3,261,123 A * | 7/1966 | Gugliotta | | 43/19 |
| 3,266,184 A * | 8/1966 | Brown | | 43/19 |
| 3,279,115 A * | 10/1966 | Worsham | | 43/19 |
| 3,292,295 A * | 12/1966 | Saltness | | 43/19 |
| 3,365,834 A * | 1/1968 | Kreft | | 43/19 |
| 3,400,480 A * | 9/1968 | Worsham | | 43/19 |
| 3,416,256 A * | 12/1968 | Blocker | | 43/19 |
| 3,579,896 A * | 5/1971 | Flottorp | | 43/19 |
| 3,656,252 A * | 4/1972 | Sherman | | 43/19 |
| 3,717,947 A * | 2/1973 | Nomura | | 43/19 |
| 3,787,994 A * | 1/1974 | Love | | 43/19 |
| 3,828,459 A * | 8/1974 | Easom | | 43/19 |

(Continued)

FOREIGN PATENT DOCUMENTS

| EP | 317317 A1 * | 5/1989 |
|---|---|---|
| FR | 2664468 A1 * | 1/1992 |

(Continued)

*Primary Examiner* — Darren W Ark

(57) ABSTRACT

A propelling device for propelling bait and lures featuring a tube, a bracket is disposed on the tube, and a mounting plate disposed on the bracket. The mounting plate and tube sandwich a fishing rod. A wing extends upwardly from the mounting plate to engage the reel seat base of a reel. A spring is disposed in an inner cavity of the tube. The spring can move between a relaxed position and a compressed position. A plunger extends out of the first end of the tube and is attached to an outer end of the spring. When the plunger is pulled backwardly away from the tube the spring moves to the compressed position and when the plunger is released the spring moves back to the relaxed position such that an object in front of the outer end of the spring is propelled out of the second end of the tube.

6 Claims, 5 Drawing Sheets

U.S. PATENT DOCUMENTS

| | | | | |
|---|---|---|---|---|
| 3,834,056 A | * | 9/1974 | Filippi et al. | 43/19 |
| 3,962,813 A | * | 6/1976 | Moon | 43/19 |
| 4,056,859 A | * | 11/1977 | Pace | 43/19 |
| D277,402 S | * | 1/1985 | Thompson | D22/138 |
| 4,501,085 A | * | 2/1985 | Barnes | 43/19 |
| 5,421,116 A | * | 6/1995 | Moon | 43/19 |
| 5,491,924 A | * | 2/1996 | Athanasiadis | 43/19 |
| 5,735,074 A | * | 4/1998 | Stauffer | 43/19 |
| 7,334,367 B2 | * | 2/2008 | Moss et al. | 43/19 |
| 8,276,309 B2 | * | 10/2012 | Al-Mutairi | 43/19 |
| 2007/0062095 A1 | * | 3/2007 | Euliano | 43/19 |

FOREIGN PATENT DOCUMENTS

| | | | |
|---|---|---|---|
| JP | 09028258 A | * | 2/1997 |
| JP | 11169038 A | * | 6/1999 |
| JP | 2000189019 A | * | 7/2000 |
| WO | WO 8403022 A1 | * | 8/1984 |
| WO | WO 9922592 A1 | * | 5/1999 |
| WO | WO 2004064514 A1 | * | 8/2004 |

* cited by examiner

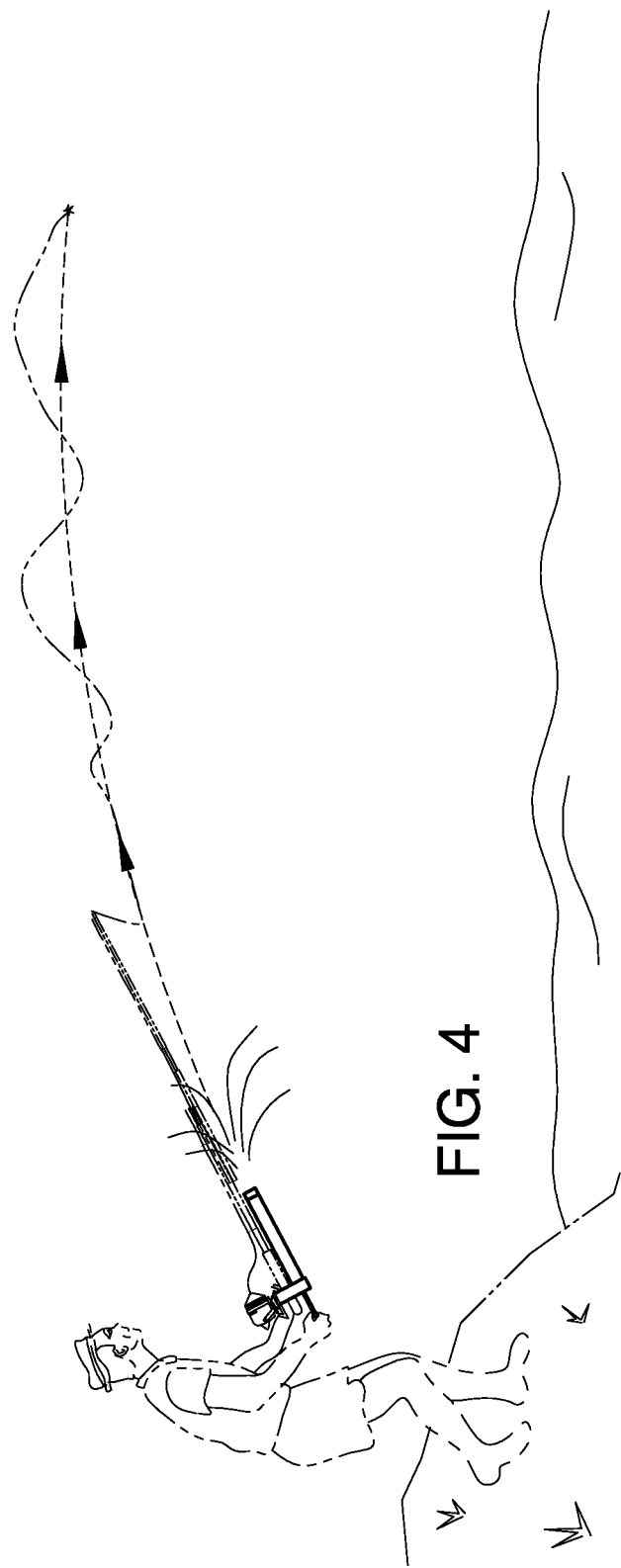

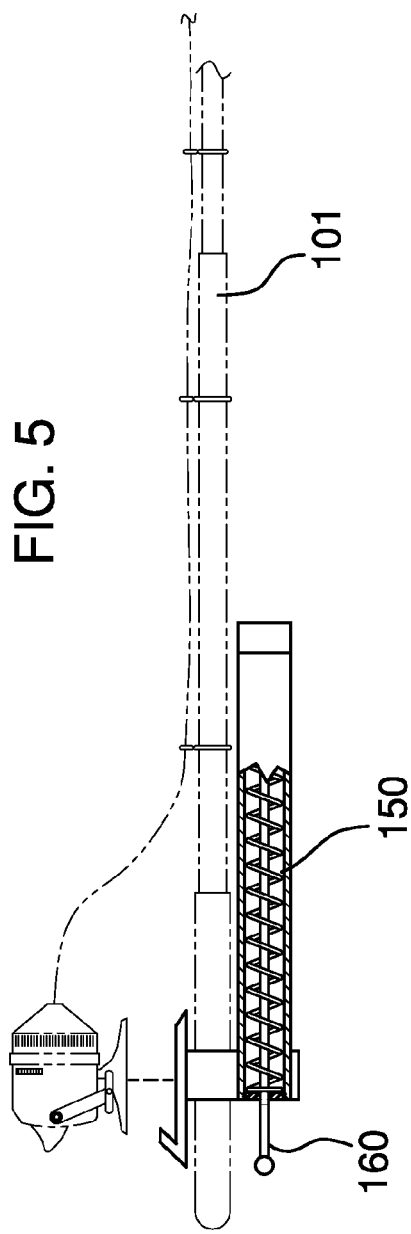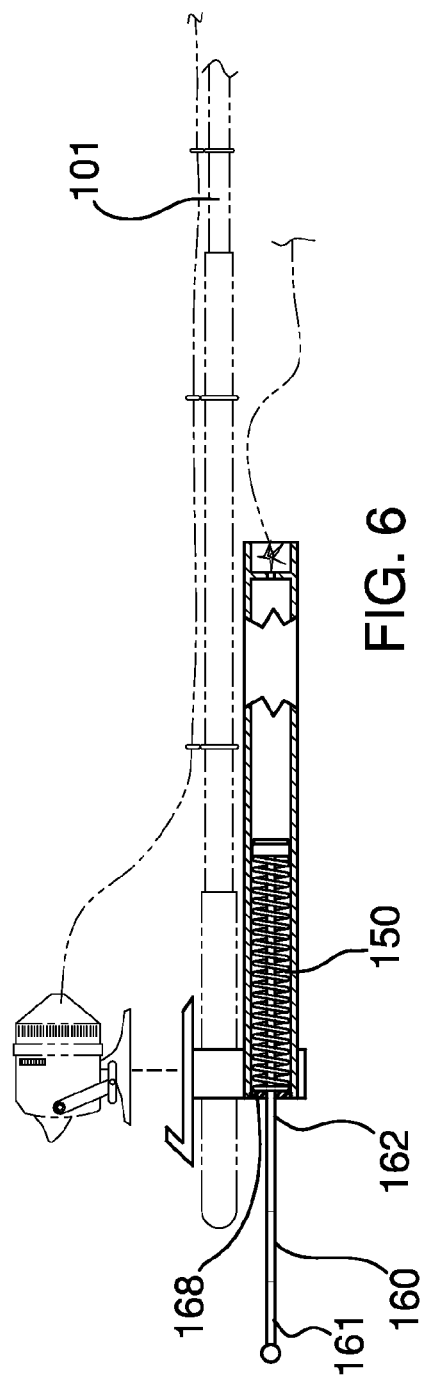

PROPELLING DEVICE FOR BAIT AND LURES

FIELD OF THE INVENTION

The present invention is directed to a fishing device, more particularly to a device for propelling bait and lures safely without requiring the standard casting motion.

BACKGROUND OF THE INVENTION

It can be very difficult to cast lines in areas that are full of brush and foliage (or in windy conditions) because oftentimes the bait or lure will get caught on something. The present invention features a propelling device for propelling bait and lures in a different manner compared to standard casting motions. The device of the present invention can be adapted to pre-manufactured rods and reels. The device of the present invention provides an easier, safer method of casting bait and lures. The device may be advantageous for individuals with limited mobility and strength.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a propelling device for propelling bait and lures. In some embodiments, the propelling device comprises an elongated and generally hollow tube having a first end and a second end, the second end being open; a bracket disposed on the tube at or near the first end, a first end of the bracket is attached to the tube and a second end of the bracket extends upwardly from the tube and generally perpendicularly to the tube a certain distance above the tube; a mounting plate disposed on the second end of the bracket, the mounting plate is generally parallel to the tube, wherein the mounting plate is positioned such that a fishing rod can be placed next to the bracket and sandwiched between the mounting plate and the tube; a wing extending upwardly from a back edge of the mounting plate, the wing and mounting plate together engage a reel seat base of a reel; a spring disposed in an inner cavity of the tube at the first end, the spring can move between a relaxed position and a compressed position, wherein the spring is biased in the relaxed position; and a plunger with a first end and a second end, the first end of the plunger extends out of the first end of the tube and the second end of the plunger is attached to an outer end of the spring, the outer end of the spring facing the second end of the tube, the plunger is slidably disposed in a plunger aperture in the first end of the tube, when the plunger is pulled backwardly away from the tube the spring moves to the compressed position and when the plunger is released the spring moves back to the relaxed position such that an object in front of the outer end of the spring is propelled out of the second end of the tube.

In some embodiments, the tube is between about 6 to 10 inches in length as measured from the first end to the second end. In some embodiments, the tube is between about 10 to 16 inches in length as measured from the first end to the second end. In some embodiments, the tube is between about 16 to 20 inches in length as measured from the first end to the second end. In some embodiments, the tube is between about 1.0 to 2.5 inches in diameter.

BRIEF DESCRIPTION OF THE DRAWINGS

FIG. 4 is an in-use view of the propelling device of the present invention.

FIG. 5 is side and internal view of the propelling device of the present invention, wherein the spring is in the relaxed position.

FIG. 6 is a side and internal view of the propelling device of the present invention, wherein the spring is in the compressed position.

DESCRIPTION OF PREFERRED EMBODIMENTS

Figure 1:
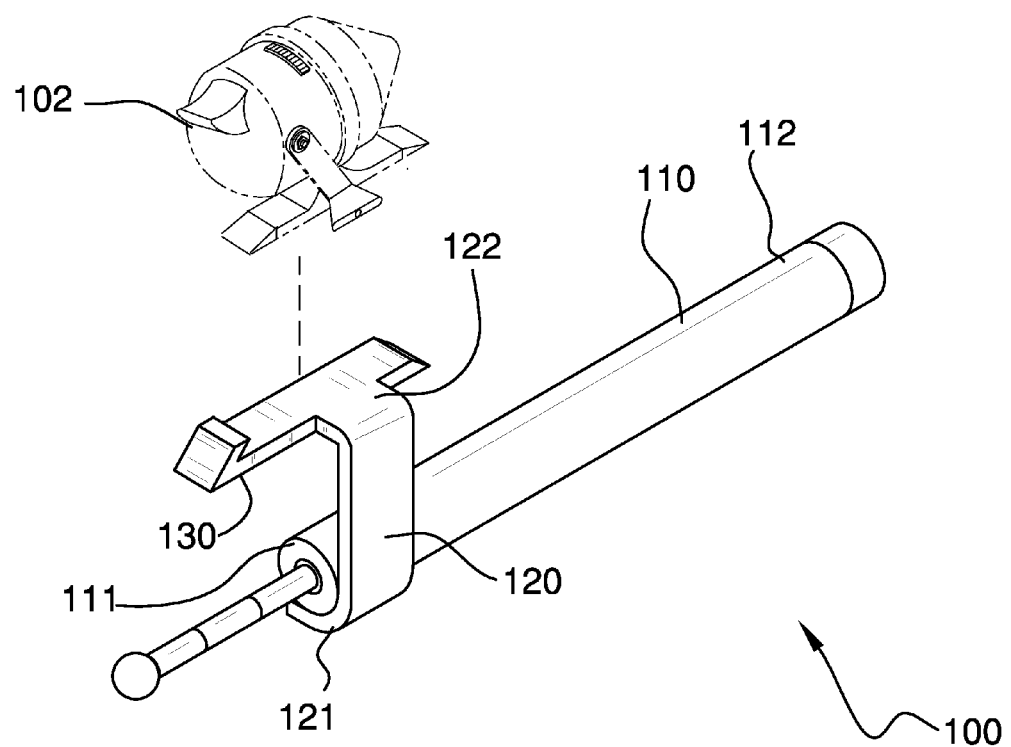
FIG. 1 is a perspective view of the propelling device of the present invention.
Figure 2:
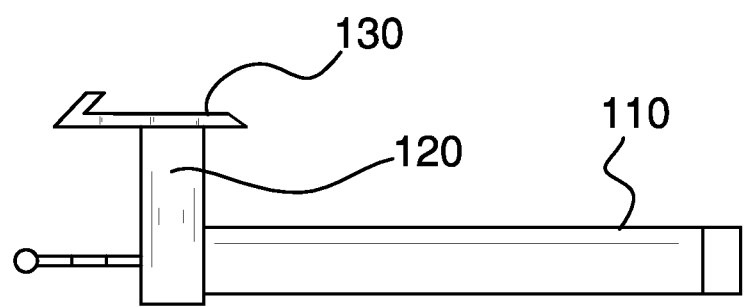
FIG. 2 is a side view of the propelling device of the present invention.
Figure 3:
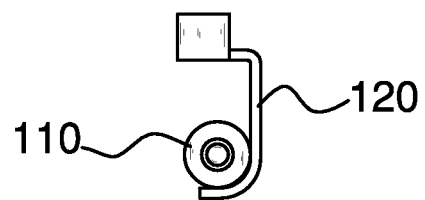
FIG. 3 is a back view of the propelling device of the present invention.
Figure 7:
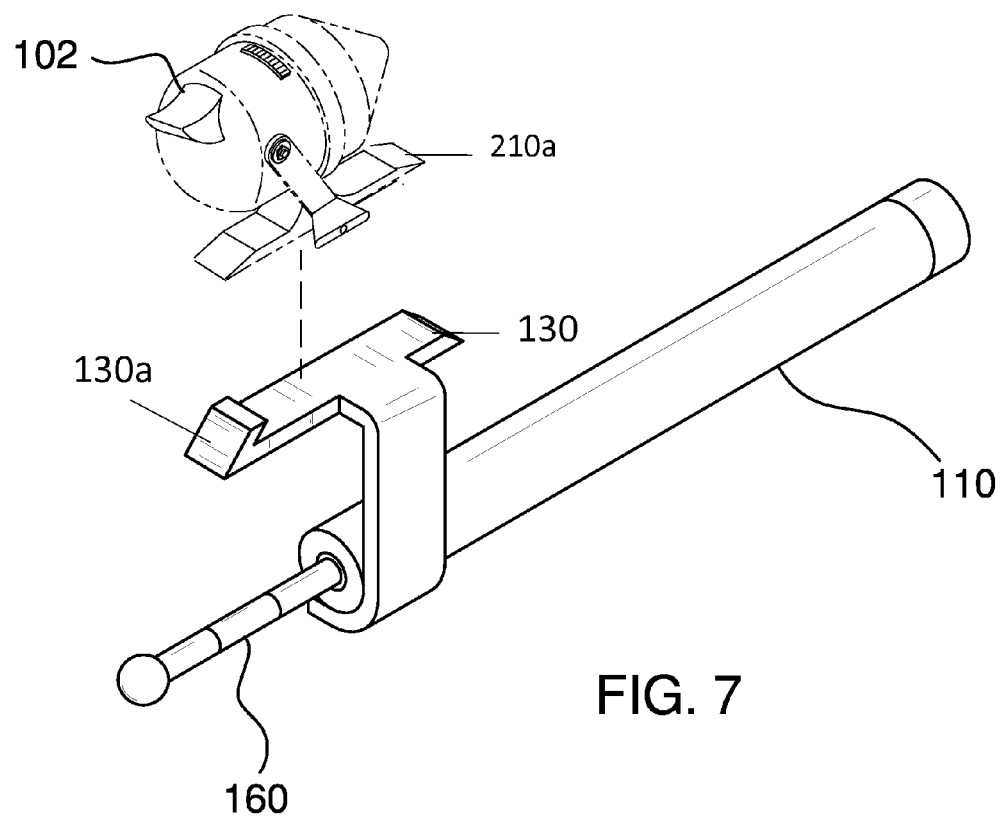
FIG. 7 is an exploded view of the propelling device of the present invention.

Referring now to FIGS. 1-7, the present invention features a propelling device 100 for propelling bait and lures. The device 100 comprises an elongated tube 110 having a first end 111 and a second end 112. The tube 110 may be constructed in a variety of sizes. For example, in some embodiments, the tube 110 is between about 6 to 10 inches in length as measured from the first end 111 to the second end 112. In some embodiments, the tube 110 is between about 10 to 16 inches in length as measured from the first end 111 to the second end 112. In some embodiments, the tube 110 is between about 16 to 20 inches in length as measured from the first end 111 to the second end 112. In some embodiments, the tube 110 is more than about 20 inches in length. In some embodiments, the tube 110 is between about 1.0 to 1.25 inches in diameter. In some embodiments, the tube 110 is between about 1.0 to 2.5 inches in diameter. In some embodiments, the tube 110 is more than about 2.5 inches in diameter. The present invention is not limited to the aforementioned dimensions.

Disposed on the tube 110 at the first end 111 is a bracket 120. The first end 121 of the bracket 120 is attached to the tube 110 and the second end 122 of the bracket 120 extends upwardly from the tube 110 (e.g., generally perpendicularly to the tube 110) a certain distance above the tube 110.

A mounting plate 130 is disposed on the second end 122 of the bracket 120. The mounting plate 130 is generally parallel to the tube 110 (e.g., the mounting plate 130 is perpendicular to the bracket 120). A fishing rod 101 can be placed next to the bracket 120 and sandwiched between the mounting plate 130 and the tube 110 (e.g., see FIG. 5, FIG. 6). In some embodiments, the mounting plate 130 has a wing 130a that extends upwardly from the back edge of the mounting plate 130. The mounting plate 130 and wing 130a function to mount a reel seat base 210a of a reel 102.

As shown in FIG. 5 and FIG. 6, a spring 150 is disposed in the inner cavity of the tube 110 at the first end. The spring 150 can move between a relaxed position (e.g., see FIG. 5) and a compressed position (see FIG. 6). The spring 150 is biased in the relaxed position. A first end 161 of a plunger 160 extends out of the first end 111 of the tube 110, and a second end 162 of the plunger 160 is attached to the outer end of the spring 150 (the outer end of the spring 150 being the end facing the second end of the tube 110). The plunger 160 is slidably disposed in a plunger aperture 168 in the first end of the tube 110. The plunger 160 can be pulled backwardly (away from the tube 110) as shown in FIG. 6 to move the spring to the compressed position. When the plunger 160 is released, the spring 150 moves back to the relaxed position. An object (e.g., a lure, bait, etc.) in front of the outer end of the spring 150 is propelled out of the open second end of the tube 110 as the spring 150 moves back to the relaxed position (e.g., see FIG. 4).

In some embodiments, the mounting plate 130 mounts underneath a fishing rod (in the rod's reel slot) so as not to interfere with the normal casting ability of the rod. In some embodiments, a carbon dioxide gas canister may be used to project the bait or lure in lieu of the spring 150 and plunger 160. In some embodiments, a user pumps a handle to increase air pressure. Also, a tubular or flat rubber band can be used as a propellant.

As used herein, the term "about" refers to plus or minus 10% of the referenced number. For example, an embodiment wherein the tube 110 is about 10 inches in length includes a tube 110 that is between 9 and 10 inches in length.

The disclosures of the following U.S. Patents are incorporated in their entirety by reference herein: U.S. Pat. No. 5,421,116; U.S. Pat. No. 3,834,056; U.S. Pat. No. 3,001,316; U.S. Design Pat. No. D277,402; U.S. Pat. No. 3,656,252; U.S. Pat. No. 2,089,744; U.S. Pat. No. 3,255,548.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A propelling system for propelling bait and lures, said propelling system comprising:
   (a) an elongated and generally hollow tube (110) having a first end (111) and a second end (112), the second end (112) being open;
   (b) a bracket (120) disposed on the tube (110) at or near the first end (111), a first end (121) of the bracket (120) is attached to the tube (120) and a second end of the bracket (122) extends upwardly from the tube (110) and generally perpendicularly to the tube (110) a certain distance above the tube;
   (c) a fishing rod (101) disposed next to the bracket (120);
   (d) a mounting plate (130) disposed on the second end (122) of the bracket (120), the mounting plate (130) is generally parallel to the tube (110), wherein the mounting plate (130) is positioned such that the fishing rod (101) is sandwiched between the mounting plate (130) and the tube (110);
   (e) a wing (130a) extending upwardly from a back edge of the mounting plate (130);
   (f) a spring (150) disposed in an inner cavity of the tube (110) at the first end (111), the spring (150) can move between a relaxed position and a compressed position, wherein the spring (150) is biased in the relaxed position;
   (g) a plunger (160) with a first end (161) and a second end (162), the first end (161) of the plunger (160) extends out of the first end (111) of the tube (110) and the second end (162) of the plunger (160) is attached to an outer end of the spring (150), the outer end of the spring (150) facing the second end (112) of the tube (110), the plunger (160) is slidably disposed in a plunger aperture (168) in the first end (111) of the tube (110), when the plunger (160) is pulled backwardly away from the tube (110) the spring (150) moves to the compressed position and when the plunger (160) is released the spring (150) moves back to the relaxed position such that an object in front of the outer end of the spring (150) is propelled out of the second end (112) of the tube (110); and
   (h) a reel (102) having a reel seat base (210a) disposed underneath the wing (130a) on the mounting plate (130), wherein the wing (130a) and the mounting plate (130) together engage the reel seat base (210a) of the reel (102), wherein the reel (102) is disposed on a first side of the fishing rod (101), wherein the tube (110) is disposed on a second, opposed side of the fishing rod (101), wherein the fishing rod (101) is sandwiched between the reel (102) and the tube (110).

2. The propelling system of claim 1, wherein the tube (110) is between about 6 to 10 inches in length as measured from the first end (111) to the second end (112).

3. The propelling system of claim 1, wherein the tube (110) is between about 10 to 16 inches in length as measured from the first end (111) to the second end (112).

4. The propelling system of claim 1, wherein the tube (110) is between about 16 to 20 inches in length as measured from the first end (111) to the second end (112).

5. The propelling system of claim 1, wherein the tube (110) is between about 1.0 to 2.5 inches in diameter.

6. A propelling system for propelling bait and lures, said propelling system consisting of:
   (a) an elongated and generally hollow tube (110) having a first end (111) and a second end (112), the second end (112) being open;
   (b) a bracket (120) disposed on the tube (110) at or near the first end (111), a first end (121) of the bracket (120) is attached to the tube (120) and a second end of the bracket (122) extends upwardly from the tube (110) and generally perpendicularly to the tube (110) a certain distance above the tube;
   (c) a fishing rod (101) disposed next to the bracket (120);
   (d) a mounting plate (130) disposed on the second end (122) of the bracket (120), the mounting plate (130) is generally parallel to the tube (110), wherein the mounting plate (130) is positioned such that the fishing rod (101) is sandwiched between the mounting plate (130) and the tube (110);
   (e) a wing (130a) extending upwardly from a back edge of the mounting plate (130);
   (f) a spring (150) disposed in an inner cavity of the tube (110) at the first end (111), the spring (150) can move between a relaxed position and a compressed position, wherein the spring (150) is biased in the relaxed position;
   (g) a plunger (160) with a first end (161) and a second end (162), the first end (161) of the plunger (160) extends out of the first end (111) of the tube (110) and the second end (162) of the plunger (160) is attached to an outer end of the spring (150), the outer end of the spring (150) facing the second end (112) of the tube (110), the plunger (160) is slidably disposed in a plunger aperture (168) in the first end (111) of the tube (110), when the plunger (160) is pulled backwardly away from tube (110) the spring (150) moves to the compressed position and when the plunger (160) is released the spring (150) moves back to the relaxed position such that an object in front of the outer end of the spring (150) is propelled out of the second end (112) of the tube (110); and (h) a reel (102) having a reel seat base (210a) disposed underneath the wing (130a) on the mounting plate (130), wherein the wing (130a) and the mounting plate (130) together engage the reel seat base (210a) of the reel (102), wherein the reel (102) is disposed on a first side of the fishing rod (101), wherein the tube (110) is disposed on a second, opposed side of the fishing rod (101), wherein the fishing rod (101) is sandwiched between the reel (102) and the tube (110).

\* \* \* \* \*